United States Patent
Kim et al.

(10) Patent No.: US 7,378,471 B2
(45) Date of Patent: May 27, 2008

(54) POLYMER COMPRISING TERMINAL SULFONIC ACID GROUP, AND POLYMER ELECTROLYTE AND FUEL CELL USING THE SAME

(75) Inventors: Do-yun Kim, Daejeon-si (KR); Min-ju Jeong, Seoul (KR); Myung-sup Jung, Seongnam-si (KR); Bong-seok Moon, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 645 days.

(21) Appl. No.: 10/972,498

(22) Filed: Oct. 26, 2004

(65) Prior Publication Data

US 2005/0112440 A1 May 26, 2005

(30) Foreign Application Priority Data

Oct. 27, 2003 (KR) .................. 10-2003-0075221

(51) Int. Cl.
*C08F 8/18* (2006.01)
(52) U.S. Cl. .................. 525/328.8; 525/359.3; 525/384; 525/419; 525/420
(58) Field of Classification Search ........... 525/328.8, 525/359.3, 384, 419, 420
See application file for complete search history.

(56) References Cited

U.S. PATENT DOCUMENTS

| | | | | |
|---|---|---|---|---|
| 5,438,082 A | * | 8/1995 | Helmer-Metzmann et al. ... | 522/149 |
| 5,852,128 A | * | 12/1998 | Padmanaban et al. ... | 525/328.8 |
| 6,033,828 A | * | 3/2000 | Shimada et al. ....... | 430/270.11 |
| 6,194,474 B1 | * | 2/2001 | Kerres et al. .................. | 521/27 |
| 6,210,859 B1 | * | 4/2001 | Jeon et al. ................ | 430/270.1 |
| 6,759,483 B2 | * | 7/2004 | Sheehan et al. ......... | 525/328.8 |
| 2002/0188097 A1 | * | 12/2002 | Goto et al. .................. | 528/397 |

* cited by examiner

*Primary Examiner*—Bernard Lipman
(74) *Attorney, Agent, or Firm*—H.C. Park & Associates, PLC

(57) ABSTRACT

The present invention is related to a polymer comprising terminal sulfonic acid groups, which has a high ionic conductivity and good structural stability, does not decompose even under low humidity conditions, and is inexpensive to produce. Furthermore, the present invention is related to a polymer electrolyte and a fuel cell using the same. The polymer of the present invention has a substituent comprising a terminal sulfonic acid group comprising Formula (1) at a side chain:

Formula 1

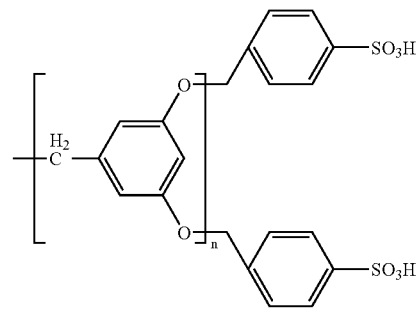

where n may be a number in the range of about 1 to about 5.

6 Claims, No Drawings

POLYMER COMPRISING TERMINAL SULFONIC ACID GROUP, AND POLYMER ELECTROLYTE AND FUEL CELL USING THE SAME

CROSS-REFERENCE TO RELATED APPLICATIONS

This application claims priority to Korean Patent Application No. 2003-75221, filed on Oct. 27, 2003, in the Korean Intellectual Property Office, the disclosure of which is incorporated herein in its entirety by reference.

FIELD OF THE INVENTION

The present invention is related to a polymer comprising terminal sulfonic acid groups, a polymer electrolyte and a fuel cell using the same. Specifically, the present invention is related to polymers comprising terminal sulfonic acid groups which have high ionic conductivity and good structural stability, do not decompose even under low humidity conditions, and inexpensive to produce.

BACKGROUND

Fuel cells are energy storing systems in which chemical energy is converted into electrical energy through an electrochemical reaction of fuel with oxygen. Since fuel cells are not based on the Carnot cycle, they are clean energy sources having a higher theoretical power generation efficiency than energy using fossil fuels and do not discharge a significant amount of environmental contaminants. Such fuel cells can be used as power sources for small electric/electronic devices, particularly portable devices, as well as for industrial, domestic, and transportation applications.

Fuel cells can be classified into molten carbonate fuel cells which operate at higher temperatures of approximately 500° C. to 700° C., phosphoric acid electrolyte cells which operate at approximately 200° C., and alkaline electrolyte fuel cells and polymer electrolyte membrane (PEM) fuel cells which operate at room temperature or at approximately 100° C. The working temperature and constituent materials of fuel cells are determined depending on the type of electrolyte used in a cell.

Fuel cells can be classified into an external reformer type where fuel is supplied to the anode after being converted into hydrogen-rich gas by a fuel reformer, and a direct fuel supply type or internal reformer type where fuel in gaseous or liquid state is directly supplied to the anode. A representative example of a direct liquid fuel supply type fuel cell is a direct methanol fuel cell (DMFC). DMFCs generally use an aqueous methanol solution as fuel, and a polymer electrolyte membrane with hydrogen ionic conductivity as an electrolyte. It is known that since DMFCs do not require an external reformer and use fuel that is convenient to handle, they have a high potential for use as portable energy sources.

Electrochemical reactions in a DMFC occur when fuel is oxidized at the anode, and oxygen is reduced into water through a reaction with hydrogen ions at the cathode.

| Anode Reaction: | $CH_3OH + H_2O \rightarrow 6\ H^+ + 6\ e^- + CO_2$ |
| Cathode Reaction: | $1.5\ O_2 + 6\ H^+ + 6\ e^- \rightarrow 3\ H_2O$ |
| Overall Reaction: | $CH_3OH + 1.5\ O_2 \rightarrow 2\ H_2O + CO_2$ |

As seen above, one methanol molecule reacts with one water molecule at the anode to produce one carbon dioxide molecule, six hydrogen ions and six electrons. The produced hydrogen ions migrate to the cathode through a polymer electrolyte membrane where they react with oxygen and electrons, which are supplied via an external circuit to produce water. Summarizing the overall reaction in the DMFC, water and carbon dioxide are produced through the reaction of methanol with oxygen. As a result, a substantial part of the energy equivalent to the heat of combustion of methanol is converted into electrical energy.

The polymer electrolyte membrane having hydrogen ionic conductivity acts as a path for the hydrogen ions generated through the oxidation reaction at the anode to migrate to the cathode, and as a separator between the anode and the cathode. The polymer electrolyte membrane requires sufficiently high ionic conductivity to facilitate rapid migration of a large number of hydrogen ions, electrochemical stability, and mechanical strength suitable for a separator, thermal stability at working temperature, ease of processing into a thin film so that its resistance to ionic conduction can be lowered, and a non-swelling property when permeated by liquid.

Fluorinated polymer membranes such as Nafion (Dupont), Assiflex (Asahi Chemicals), and Flemion (Asahi Glass) are available as polymer membranes for fuel cells. These fluorinated polymer membranes operate relatively well at low temperature, but lose water contained therein at higher temperatures of at least 130° C., thereby causing destruction of the ion channel structure and affecting ionic conductivity. In the case of DMFC, methanol leakage through the membrane occurs and its practicality is low. Also, since the fluorinated polymer membrane is so expensive, it is difficult to commercialize.

To overcome such problems, research aimed at developing a less expensive polymer membrane than Nafion, such as a trifluorostyrene copolymer disclosed in U.S. Pat. No. 5,422,411, has been conducted. However, the less expensive polymer membrane has poor mechanical properties and film forming ability. Also, systems using sulfonated aromatic polymers such as polyimide or polyether sulfone are highly brittle making it difficult to form the membrane. A sulfonic acid group ($—SO_3H$) introduced to provide ionic conductivity increases the brittleness of the system, and thus a stable membrane cannot be formed. To overcome these disadvantages, the rate of sulfonation of the polymer may be lowered or the thickness of the membrane may be increased. In this case, the ion exchange ability of the membrane remarkably decreases, and consequently, the performance of a fuel cell using the electrolyte membrane is lowered.

SUMMARY OF THE INVENTION

The present invention is directed to a polymer comprising terminal sulfonic acid groups having a high ionic conductivity and methods for preparing the same. Furthermore, the present invention is also directed to a polymer electrolyte and a fuel cell comprising the polymer described above.

According to an aspect of the present invention, a polymer having a substituent comprising a terminal sulfonic acid group of Formula (1) at a side chain may be provided:

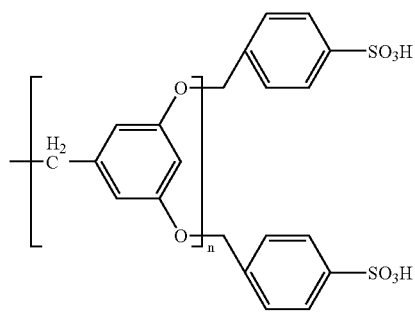

Formula 1 where n may be a number in the range of about 1 to about 5. In additional aspects, methods of preparing a polymer having the substituent of Formula (1) at a side chain may also be provided. The methods of the present invention may comprise providing a hyper-branch to a side chain of a polymer having a hydroxy group through a one pot reaction of bromomethyl dihydroxybenzene with benzylbromide, and then substituting the hydrogen atom of the hyper-branch with a sulfonic acid group.

According to another aspect of the present invention, methods of preparing a polymer having the substituent comprising Formula (1) at a side chain are also provided. The method may comprise reacting a polymer having a hydroxy group with a monomer comprising Formula (7) in order to introduce a hyper-branch to a side chain of the polymer, and then substituting the hydrogen atom of the hyper-branch with a sulfonic acid group.

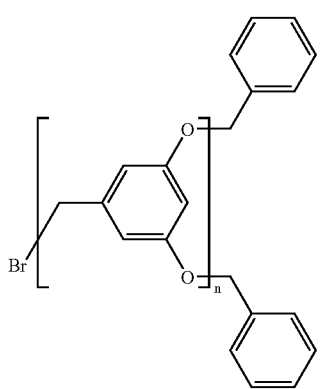

Formula 7 where n may be a number in the range of about 1 to about 5.

According to another aspect of the present invention, there is provided a polymer electrolyte obtained by cross linking the polymer described above. According to another aspect of the present invention, there is provided a fuel cell using the above polymer electrolyte.

DETAILED DESCRIPTION OF THE INVENTION

The present invention is directed to a side chain of a polymer that may be substituted with a dendrimer having two or more phenyl groups. Additionally, the polymer may be sulfonated. The present invention is also directed to a polymer comprising a plurality of sulfonic acid groups resulting in a polymer which has high ionic conductivity. Furthermore, the present invention is related to methods for manufacturing a polymer electrolyte having high ionic conductivity even under low humidity conditions by cross linking a polymer using a cross linker and a fuel cell using the same.

In an embodiment of the present invention, the polymer of the polymer electrolyte may comprise a substituent having a terminal sulfonic acid group comprising the Formula (1) at a side chain:

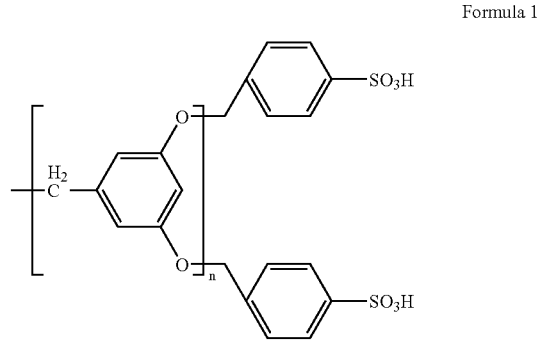

Formula 1 where n may be a number in the range of about 1 to about 5.

In another embodiment, the polymer described above may be a polymer comprising Formula (2), as illustrated below:

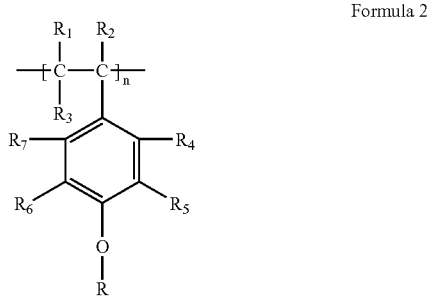

Formula 2 where each of $R_1$, $R_2$, $R_3$, $R_4$, $R_5$, $R_6$, and $R_7$ may independently be a hydrogen atom, a substituted or non-substituted $C_{1-6}$ alkyl group, or a halogen atom, for example. Additionally, n may be a number in the range of about 10 to about 1000 and R may be a substituent comprising Formula (1), as described above.

In further embodiment, the polymer comprising Formula (2) may further comprise a repeating unit having a formula (3), as depicted below:

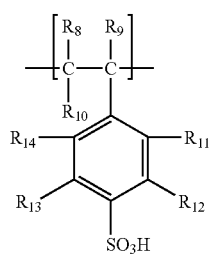
Formula 3

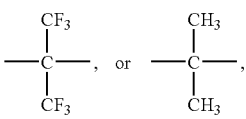

where each of $R_8$, $R_9$, $R_{10}$, $R_{11}$, $R_{12}$, $R_{13}$, and $R_{14}$ may independently be a hydrogen atom, a substituted or non-substituted $C_{1-6}$ alkyl group, or a halogen atom, for example.

In a particular embodiment, the polymer comprising Formula (2), may further comprise the repeating unit of Formula (3) and may be a polymer having Formula (4) below:

n may be a number in the range of about 3 to about 1000 and R may be the substituent having Formula (1).

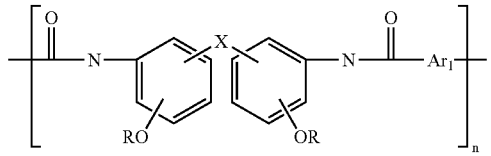
Formula 6 where $Ar_1$ may be a single bond, a substituted or non-substituted $C_{1-6}$ alkylene group, or a substituted or non-substituted $C_{6-20}$ arylene group, for example. Additionally, X may be a single bond, —O—, —S—, a $C_{1-6}$ alkylene group,

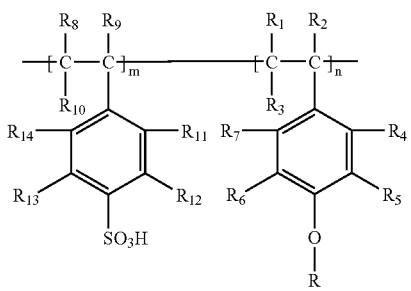
Formula 4

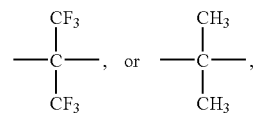

where each of $R_1$, $R_2$, $R_3$, $R_4$, $R_5$, $R_6$, $R_7$, $R_8$, $R_9$, $R_{10}$, $R_{11}$, $R_{12}$, $R_{13}$, and $R_{14}$ may independently be, for example, a hydrogen atom, a substituted or non-substituted $C_{1-6}$ alkyl group, or a halogen atom. Additionally, n may be a number in the range of about 5 to about 1000, m may be a number in the range of about 5 to about 1000, m/n may be a number in the range of about 0.001 to about 5, and R may the substituent comprising Formula (1).

In an additional embodiment, the polymer having a substituent of Formula (1) may be a polymer having Formula (5) or (6), as illustrated below:

n may be a number in the range of about 3 to about 1000, and R may be the substituent having Formula (1).

Examples of the tetravalent aromatic organic group may include functional groups having Formulas (5A) through (5F), as illustrated below:

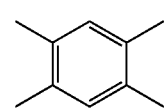
Formula 5A

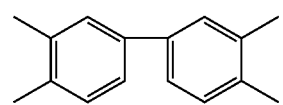
Formula 5B

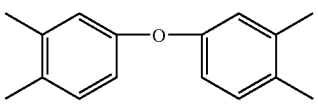
Formula 5C

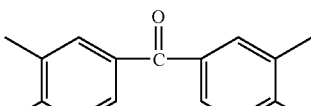
Formula 5D

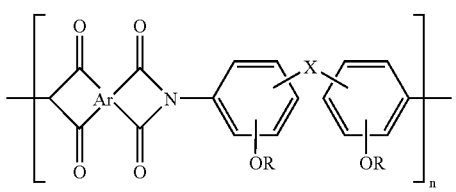
Formula 5

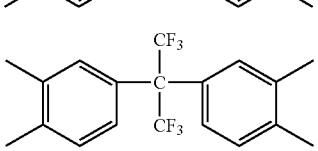
Formula 5E where Ar may be a tetravalent aromatic or aliphatic organic group, for example. Also, X may be a single bond, —O—, —S—, a $C_{1-6}$ alkylene group, -continued

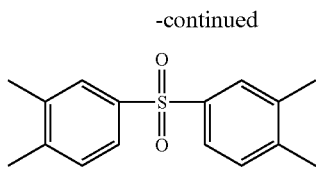

Formula 5F

In a further embodiment, the polymer comprising the substituent having Formula (1) at a side chain may be prepared through various methods known in the art and in particular, the examples described below.

According to an embodiment of the present invention, a method of preparing the polymer having the substituent having Formula (1) at a side chain may comprise providing a hyper-branch to a side chain of a polymer having a hydroxy group through a one-pot reaction of bromomethyl dihydroxybenzene with benzylbromide and substituting a hydrogen atom of the hyper-branch with a sulfonic acid group.

Another embodiment for preparing the polymer comprising the substituent having Formula (1) at a side chain may comprise reacting a polymer having a hydroxy group with a monomer having Formula (7), depicted below, for introducing a hyper-branch to a side chain of the polymer, and substituting a hydrogen atom of the hyper-branch with a sulfonic acid group.

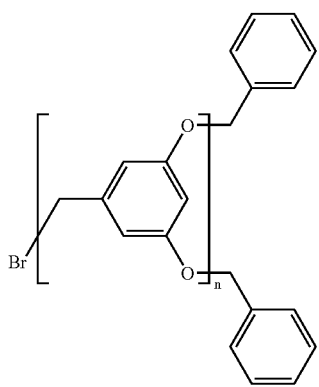

Formula 7 where n may be a number in the range of about 1 to about 5.

According to the present invention, methods for preparing a polymer electrolyte, which has a non-swelling property and has high ionic conductivity even under low humidity conditions, are provided. In particular, a polymer electrolyte may be manufactured by cross linking the polymer using a cross linker. Examples of the cross linker may include, but are not limited to, $H_3PO_4$ and/or 4-hydroxymethylimidazole.

In further embodiments, the present invention is directed to a fuel cell using the polymer electrolyte. The polymer electrolyte according to the present invention may be applied to all types of fuel cells, and for example, to polymer electrolyte membrane fuel cells (PEMFCs) using hydrogen as fuel, and to direct methanol fuel cells (DMFCs) using a mixture of methanol vapor and water vapor or an aqueous methanol solution as fuel. In particular, the polymer electrolyte according to the present invention may be applied to DMFCs using an aqueous methanol solution.

The present invention also provides a fuel cell comprising a cathode where oxygen is reduced, an anode where fuel is oxidized, and an electrolyte interposed between the cathode and the anode, where the electrolyte may be the polymer of the present invention. The cathode may include a catalyst layer that may catalyze the reduction of oxygen. The catalyst layer may include catalyst particles and a polymer having cation exchange groups. The catalyst may be a carbon supported Pt (Pt/C) catalyst, for example.

The anode may include a catalyst layer that catalyzes the oxidation of fuel, such as hydrogen, natural gas, methanol, ethanol, and the like. The catalyst layer may further include catalyst particles and a polymer having cation exchange groups. Specific examples of the catalyst may include a Pt/C catalyst, a carbon supported Pt—Ru catalyst, and the like. In particular, the carbon supported Pt—Ru catalyst may be useful when an organic fuel other than hydrogen is directly supplied to the anode.

The catalyst used in the cathode and the anode may include catalytic metal particles and a catalyst carrier. As the catalyst carrier, solid powder, such as carbon powder, having conductivity and having micropores capable of supporting the catalytic metal particles may be used. Examples of the carbon powder may include carbon black, Ketzen black, acetylene black, activated carbon powder, carbon nanofiber powder, and mixtures thereof, for example. As the polymer having cation exchange groups, the polymer described above may be used.

The catalyst layers of the cathode and the anode, respectively, may be in contact with the polymer electrolyte. Each of the cathode and the anode may further comprise a gas diffusion layer in addition to the catalyst layer. The gas diffusion layer may be composed of porous material with electroconductivity. The gas diffusion layer may act as a current collector and as an entry/exit path of reactants and products. As the gas diffusion layer, carbon paper may be used. In particular, the carbon paper may be waterproof, and more particularly, a waterproof carbon paper to which a waterproof carbon black layer may be applied. The waterproof carbon paper may include a hydrophobic polymer, such as polytetrafluoroethylene (PTFE). The hydrophobic polymer may be sintered. The gas diffusion layer may be waterproof to ensure the entry/exit path of both polar liquid reactant and gaseous reactant. Where the waterproof carbon paper comprises the waterproof carbon black layer, the waterproof carbon black layer may include a carbon black and a hydrophobic polymer, such as PTFE, as a hydrophobic binder. The waterproof carbon black layer may be applied to a side of the waterproof carbon paper, as described above. The hydrophobic polymer of the waterproof carbon black layer may be sintered. The cathode and the anode may be manufactured through any method known in the art.

In a particular embodiment, the fuel that may be supplied to the anode of the fuel cell may be, for example, hydrogen, natural gas, methanol, ethanol, and the like. Alternatively, liquid fuel including polar organic fuel and water may be supplied to the anode. The polar organic fuel may comprise, for example, methanol, ethanol, and the like. The liquid fuel may be an aqueous methanol solution.

The present invention will be described in greater detail with reference to the following examples. The following examples are for illustrative purposes and are not intended to limit the scope of the invention.

EXAMPLES

Specific Example 1

In an atmosphere of nitrogen, 3.2 g of second-generation dendrimer $C_2$—Br was dissolved in tetrahydrofurane in a three-neck reaction flask equipped with a stirrer, and 0.5 g of polyhydroxystyrene, 1.2 g of $K_2CO_3$ and 0.2 g of 1 8-crown-6 were added to the solution and mixed while keeping the temperature of the reaction mixture at 80° C. After reacting for 12 hours, the resulting product was poured into a 1:1 mixture of water and methanol to form a precipitate. The precipitate was filtered to obtain polymer powder. The obtained polymer powder was dried in a vacuum oven at 60° C. for 24 hours. The polymer product comprised Formula (8) as shown below. The product was analyzed by IR spectrum analysis. The analysis indicated that the peak at 3300 to 3600 cm$^{-1}$ which is attributed to the OH group had disappeared, indicating that the polymer comprising Formula (8) was synthesized.

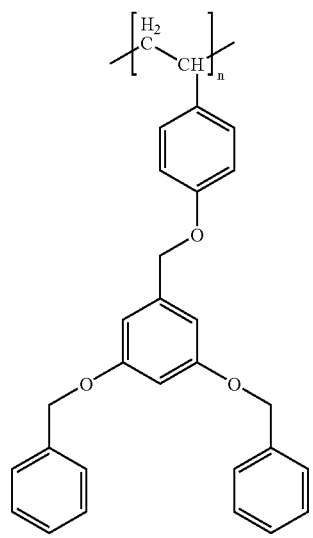

Formula 8

$M_n$: 52,800

$M_w$: 102,100

$T_g$: 125° C.

Specific Example 2

The polymer powder obtained in Example 1 was dissolved in a sulphuric acid solution and reacted at 80° C. for 12 hours. Then, the reaction product was poured into ether to form a precipitate. The precipitate was filtered and dissolved in water. The solution was purified by a dialysis membrane and a polymer having the Formula (9), shown below, was obtained. The IR spectrum of the product was analyzed. The results indicated that peaks at 1238 and 1136 cm$^{-1}$ which are attributed to —SO$_3$H had appeared, indicating that the polymer having Formula (9) below was synthesized.

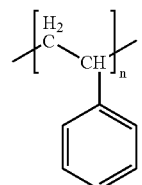
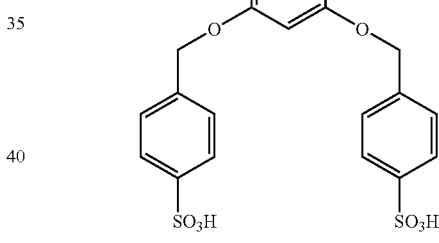

Formula 9

Specific Example 3

In an atmosphere of nitrogen, 2.4 g of polyhydroxystyrene, 4.1 g of 3,5-dihydroxybenzyl bromide, 5.0 g of $K_2CO_3$, and 0.6 g of 18-crown-6 were dissolved in DMSO in a three-neck reaction flask equipped with a stirrer and reacted at 100° C. for 1 hour. 7.5 g of benzyl bromide and 10.0 g of $K_2CO_3$ were added to the reaction and heated at 100° C. for 48 hours. The resulting product was precipitated in water and filtered to obtain polymer powder. The obtained polymer powder was dried in a vacuum oven at 60° C. for 24 hours.

The resulting polymer is represented by Formula (10), as illustrated below. Upon analysis of an IR spectrum of the product, a peak at 3300 to 3600 cm$^{-1}$ attributed to OH groups disappeared, indicating that the polymer having Formula (10) was synthesized.

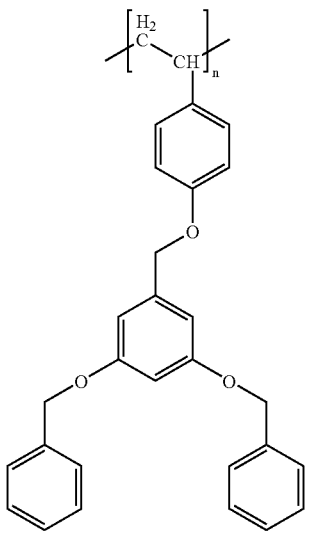

Formula 10

$M_n$: 38,200
$M_w$: 76,800
$T_g$: 132° C.

Specific Example 4

The polymer powder obtained in Example 3 was dissolved in a sulphuric acid solution and reacted at 80° C. for 12 hours. Then, the reaction product was poured into ether to form a precipitate. The precipitate was filtered and dissolved in water. The solution was purified by a dialysis membrane and a polymer having the Formula (11), as depicted below, was obtained. Upon analysis of an IR spectrum of the product, peaks at 1211 and 1132 cm$^{-1}$ attributed to —SO$_3$H appeared, indicating that the polymer having Formula (11) below was synthesized.

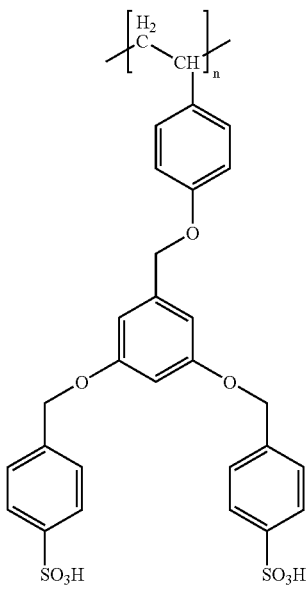

Formula 11

Specific Example 5

In an atmosphere of nitrogen, 4.0 g of polyimide and 5.0 g of second-generation dendrimer C$_2$—Br were dissolved in NMP in a three-neck reaction flask equipped with a stirrer, and 1.5 g of triethylamine was added to the solution and then reacted for 12 hours. The resulting product was poured into a 4:1 mixture of water and methanol to form a precipitate. The precipitate was filtered to obtain a polymer powder. The obtained polymer powder was dried in a vacuum oven at 60° C. for 24 hours. The obtained polymer had Formula (12), as illustrated below.

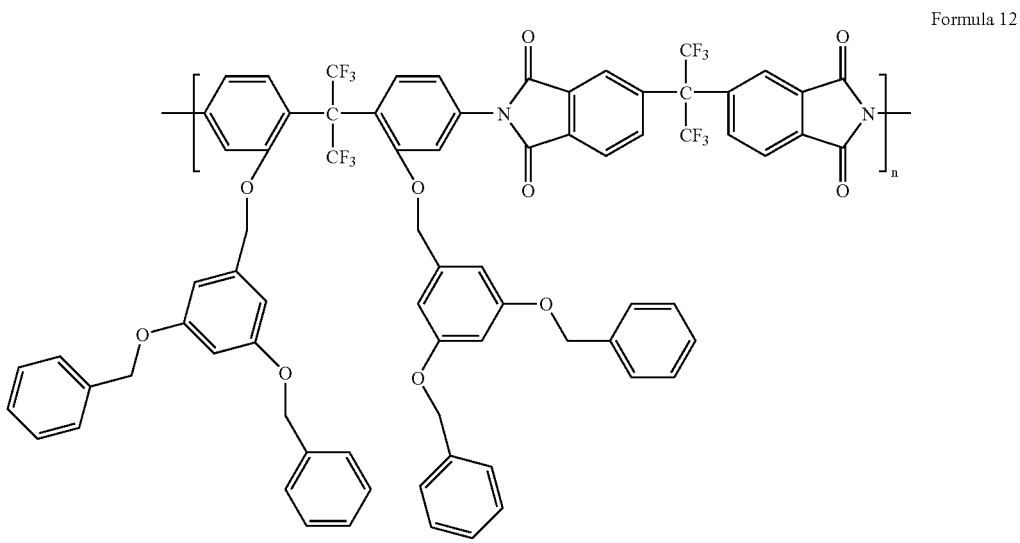

Formula 12

$M_n$: 4,830
$M_w$: 10,200
$T_g$: 166° C.

Specific Example 6

The polymer powder obtained in Example 5 was dissolved in a sulphuric acid solution and reacted at 80° C. for 12 hours, and then, the reaction product was poured into ether to 10 form a precipitate. The precipitate was filtered and dissolved in water. The solution was purified by a dialysis membrane and a polymer having the Formula (13), shown below, was obtained. Upon analysis of an IR spectrum of the product, peaks at 1220 and 1128 $cm^{-1}$ attributed to —$SO_3H$ appeared, indicating that the polymer having Formula (13) was synthesized.

TABLE 1

| | Ionic conductivity (S/cm) | |
|---|---|---|
| | 80° C. | 120° C. |
| Example 7 | 0.07 | 0.05 |
| Example 8 | 0.05 | 0.01 |
| Nafion 115 | 0.1 | 0 |

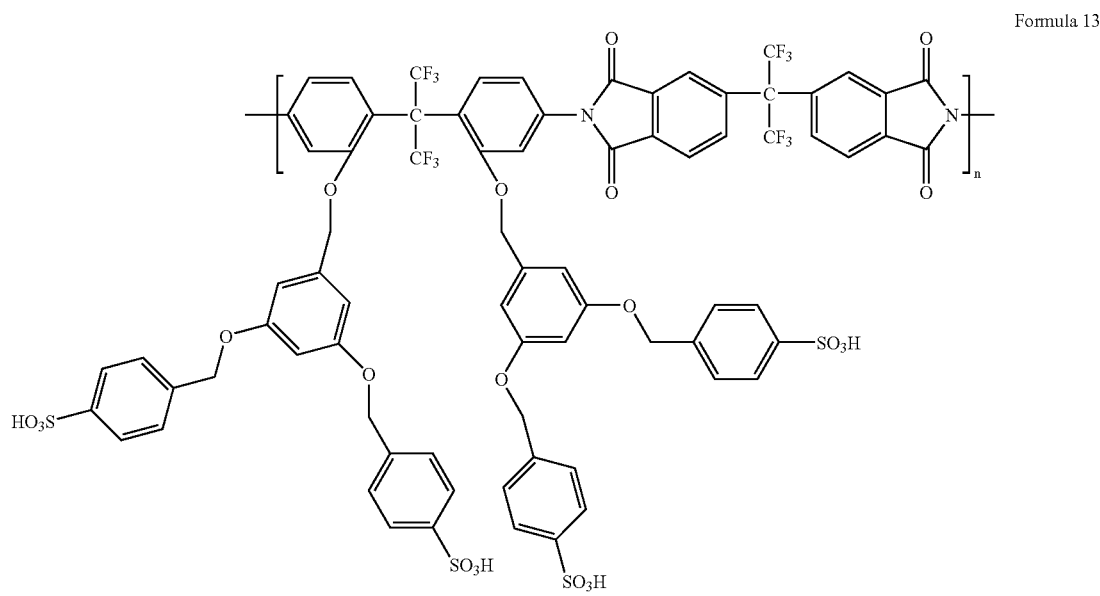

Formula 13

Specific Example 7

The polymer electrolyte solution obtained in Example 2 with $H_3PO_4$ and 4-hydroxymethylimidazole as a cross linker was heat treated on a hot plate at 180° C. for 30 minutes. As a result, a polymer electrolyte membrane was obtained.

Specific Example 8

The polymer electrolyte solution obtained in Example 6 with $H_3PO_4$ and 4-hydroxymethylimidazole as a cross linker was heat treated on a hot plate at 180° C. for 30 minutes in order to obtain the desired polymer electrolyte membrane.

Evaluation of the Properties of the Polymer Electrolyte

Ionic conductivities of the polymer electrolytes obtained in Examples 7 and 8 and Nafion 115, respectively, were measured using a Solatron 1260 impedance meter. The results are shown in Table 1, shown below.

As can be seen from Table 1, each of the polymer electrolytes of Examples 7 and 8 has a higher ionic conductivity than Nafion 115.

Evaluation of Mechanical Strength

A tensile modulus of each of the polymer electrolyte membranes of Examples 7 and 8 was measured using SHIMADZU AGS-G UTM. The polymer electrolyte membrane of Example 7 had a tensile modulus of 38% and the polymer electrolyte membrane of Example 8 had a tensile modulus of 15%.

As described above, a polymer according to the present invention may have a substituent containing a terminal sulfonic acid group at a side chain, in order to obtain a high ionic conductivity. Also, the polymer may be cross linked to obtain a polymer electrolyte which has a non-swelling property and has a high ionic conductivity even under low humidity conditions. Accordingly, a fuel cell having improved electrical and mechanical properties may be provided using the polymer electrolyte.

What is claimed is:

1. A polymer having a substituent having a terminal sulfonic acid group comprising Formula (1) at a side chain:

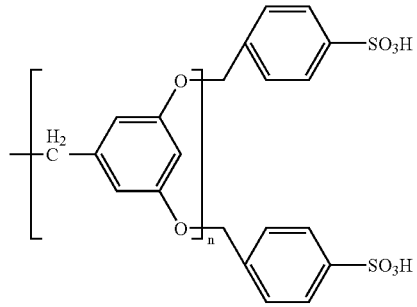
Formula 1 where n is a number in the range of about 1 to about 5.

2. The polymer of claim 1, further comprising:

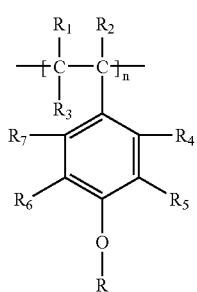
Formula 2 where each of $R_1$, $R_2$, $R_3$, $R_4$, $R_5$, $R_6$, and $R_7$ is independently selected from the group consisting of a hydrogen atom, a substituted or non-substituted $C_{1-6}$ alkyl group, and a halogen atom; where n is a number in the range of about 10 to about 1000; and where R is the substituent comprising Formula (1).

3. The polymer of claim 2, wherein the polymer comprising Formula (2) further comprises a repeating unit comprising:

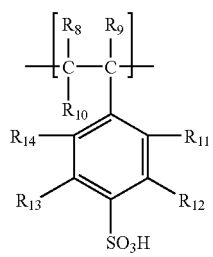
Formula 3 where each of $R_8$, $R_9$, $R_{10}$, $R_{11}$, $R_{12}$, $R_{13}$, and $R_{14}$ is independently selected from the group consisting of a hydrogen atom, a substituted or non-substituted $C_{1-6}$ alkyl group, and a halogen atom.

4. The polymer of claim 3, wherein the polymer comprising Formula (2), further comprises the repeating unit having Formula (3), and comprises Formula (4):

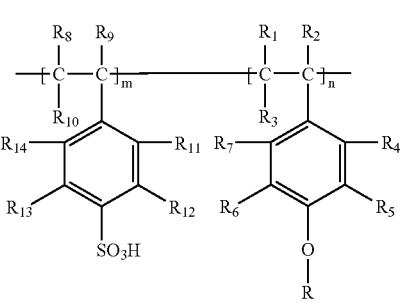
Formula 4 where each of $R_1$, $R_2$, $R_3$, $R_4$, $R_5$, $R_6$, $R_7$, $R_8$, $R_9$, $R_{10}$, $R_{11}$, $R_{12}$, $R_{13}$, and $R_{14}$ is independently selected from the group consisting of a hydrogen atom, a substituted or non-substituted $C_{1-6}$ alkyl group, and a halogen atom; where n is a number in the range of about 5 to about 1000; where m is a number in the range of about 5 to about 1000; where m/n is a number in the range of about 0.001 to about 5; and where R is the substituent comprising Formula (1).

5. The polymer of claim 1, wherein the polymer comprises:

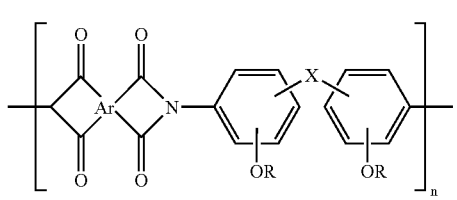
Formula 5 where Ar is a tetravalent aromatic or aliphatic organic group; X is selected from the group consisting of a single bond, —O—, —S—, a $C_{1-6}$ alkylene group,

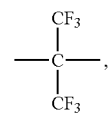

and

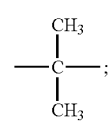

where n is a number in the range of about 3 to about 1000; and where R is the substituent comprising Formula (1).

6. The polymer of claim 1, wherein the polymer comprises:

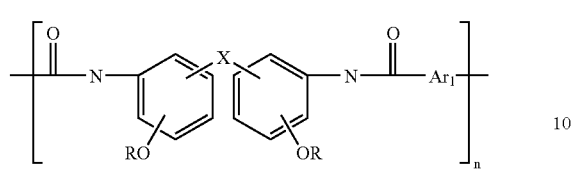

Formula 6 where $Ar_1$ is selected from the group consisting of a single bond, a substituted or non-substituted $C_{1-6}$ alkylene group, and a substituted or non-substituted $C_{6-20}$ arylene group; where X is selected from the group consisting of a single bond, —O—, —S—, a $C_{1-6}$ alkylene group,

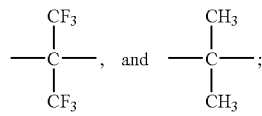

where n is a number in the range of about 3 to about 1000; and where R is the substituent comprising Formula (1).

* * * * *